Nov. 6, 1928.  1,690,093

R. C. ALLEN

SAFETY VALVE

Filed Nov. 11, 1924  2 Sheets-Sheet 2

R.C. Allen
INVENTOR

BY O.C. Davis
ATTORNEY

WITNESSES:

Patented Nov. 6, 1928.

1,690,093

UNITED STATES PATENT OFFICE.

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA.

SAFETY VALVE.

Application filed November 11, 1924. Serial No. 749,288.

My invention relates to safety valves, particularly to valves adapted for use with extremely high pressures, and it has for an object to provide apparatus of the character designated which shall operate continuously and reliably for extended periods of time. It has for a further object to provide a device of this character which shall be extremely sensitive to changes in pressure and which shall, when inoperative, provide an absolutely fluid-tight joint for preventing leakage of fluid through the valve.

Figure 1:
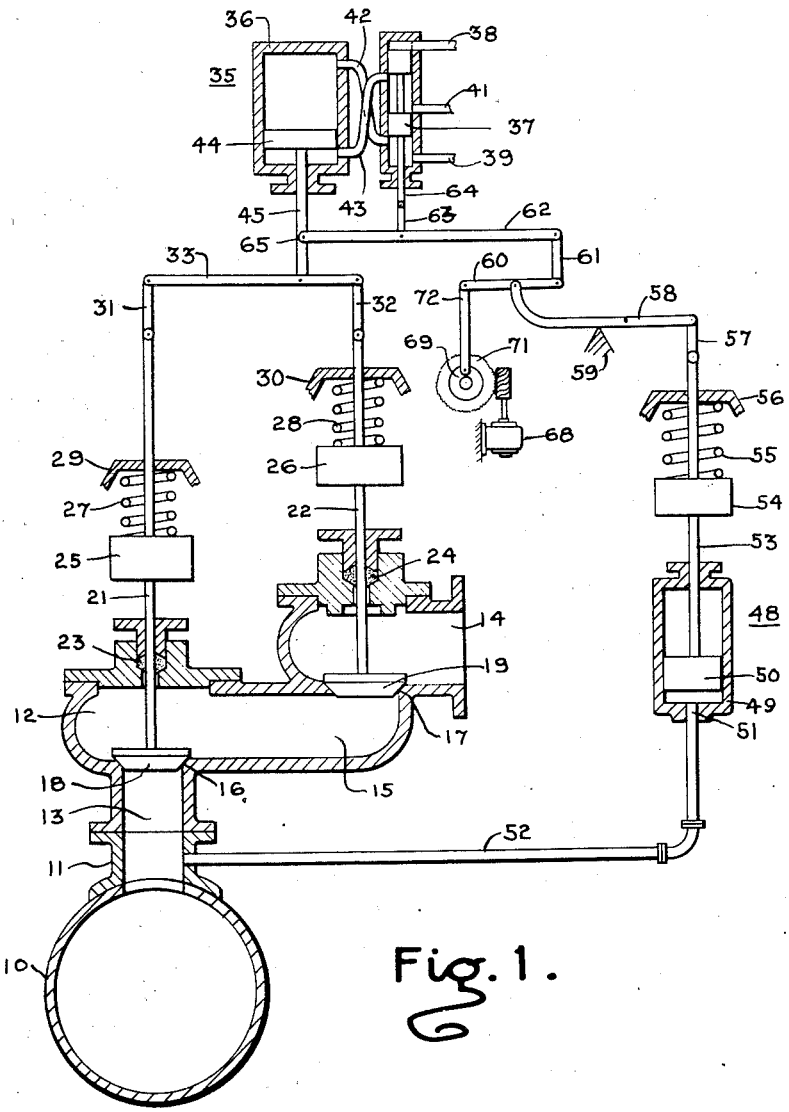
Figure 2:
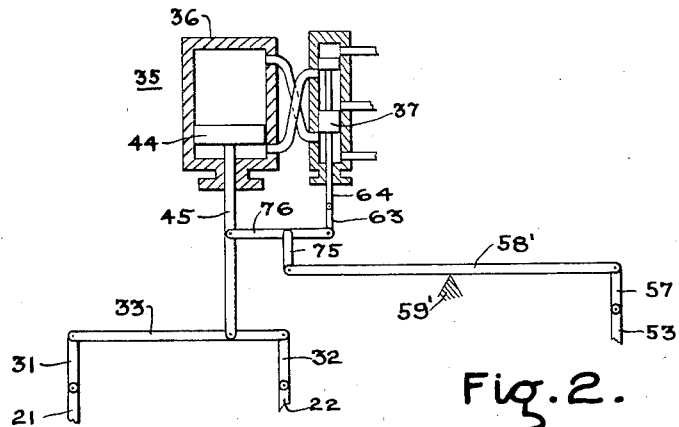
Figure 3:
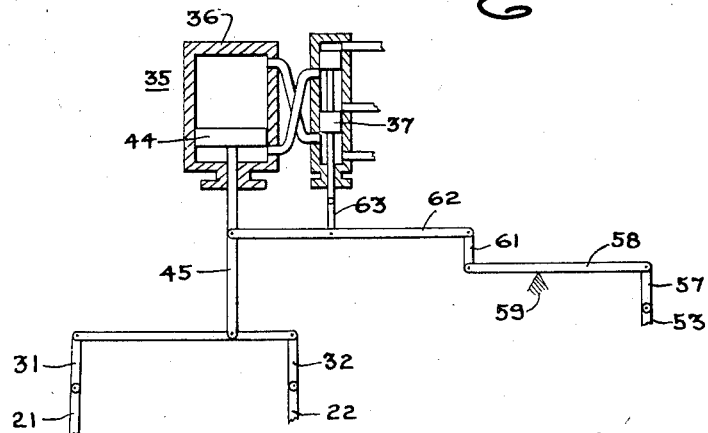

These and other objects, which will be made apparent throughout the further description of my invention, are set forth in the following specification and illustrated in the accompanying drawings in which Fig. 1 is a diagrammatic arrangement of one embodiment of my safety valve; Fig. 2 is a partial diagrammatic arrangement of another embodiment of my device in which provision has been made for securing an extremely rapid action of the valve and Fig. 3 is a partial diagrammatic arrangement of my device in which the mechanism for avoiding static friction has been omitted.

Safety valves in use at the present time usually require a spring or weight for holding the valve disc upon its seat until such time as the total pressure accumulating on the opposite side of the valve disc is sufficient to overcome the resistance exerted by the spring or weight, whereupon the disc is removed from its seat and the fluid permitted to escape. These valves are usually designed to permit of an escape of the fluid upon the accumulation of a slight pressure, for example, 10 lbs. per square inch, in excess of the designed working pressure, resulting in the valve disc being held upon its seat with but a relatively small force. While such a force may be sufficient to satisfactorily seal against relatively low pressures, it is entirely inadequate for maintaining a fluid-tight joint against working pressures of, for example, 1200 lbs. per square inch. In valves of this character, the force with which the disc is held upon its seat cannot be materially increased without impairing the valve's sensitivity. Furthermore, the useful lives of such valves are of rather short duration, inasmuch as a single valve disc is employed to open and close the valve and to regulate the flow of the fluid when open. It is well known in the art that the throttling effect, which is incident to flow regulation, produces rapid erosion, or what is generally called cutting, of the valve seat, after which continual leakage of the fluid through the valve cannot be prevented.

In my device I have overcome the difficulties which are inherent in valves heretofore described by providing two valve discs in series, one for opening or closing the flow passage through the valve and a second valve disc for throttling or regulating the flow of the fluid upon an opening of the first valve disc. In this manner, only the seat associated with the second or regulalating valve disc is subject to the cutting or erosion action of the steam, the first valve disc being always maintained in either a fully opened or closed position. The latter valve is, therefore, not subjected to the throttling action of the steam and consequently, not being deformed in any way, is capable of maintaining a fluid-tight joint for indefinite periods of time. In addition to the above, I provide means for holding the discs upon their seats by the exertion of a constant force, which force is not affected by fluctuations in the pressure of the fluid within the steam drum, and which may, if desired, be considerably in excess of the force created by the pressure of the working fluid, which tends to open the valve. I accomplish this result, without affecting the sensitiveness of the device, by providing a relay mechanism for actuating the valve discs which employs an extraneous fluid under pressure, which relay mechanism is in turn operated by a pressure responsive mechanism subject to the pressure of the working fluid. In this manner, the valve discs may be held upon their seats with such a preponderance of force as will always insure the maintenance of a fluid-tight joint.

Referring to the drawings for a more detailed description of my invention, I show in Fig. 1 a vessel 10 containing fluid under pressure which vessel may, for example, be the steam drum of a boiler. Secured to the steam drum is a saddle 11 and mounted upon the saddle 11 is a fluid-pressure relieving device or safety valve 12. The safety valve 12 is provided with an inlet connection 13, a discharge connection 14 and a connecting passage 15. Provided in the connecting passage 15 are two valve seats 16 and 17 and associated therewith are valve discs 18 and 19 which, for purposes of illustration, may be termed a regulating valve disc and a stop valve disc respectively. The valve discs 18 and 19 are provided respectively with stems 21 and 22 which extend through stuffing boxes 23 and 24 in the usual manner. The valve stems 21 and 22 may be provided with suitable weights 25 and 26 and springs 27 and 28, the springs being held under compression by suitable abutments 29 and 30. The springs and the weights are employed to bias the valves to a closed position, that is, the position illustrated, and while I have shown both a spring and a weight associated with each valve, either the weight, or the spring, or some other equivalent means, may be employed for accomplishing the purpose.

The valve stems 21 and 22 are pivotally connected respectively to floating links 31 and 32 which are in turn connected together by a lever 33. The lever 33 is actuated by a fluid relay mechanism 35 of any well known construction. It comprises a power cylinder 36 having associated therewith a pilot valve mechanism 37 provided with fluid inlet passages 38 and 39 and a fluid outlet passage 41. Suitable communicating means 42 and 43 are provided for conveying the fluid to and from the opposite ends of the power cylinder 36. Disposed within the power cylinder 36 is a piston 44 which actuates the lever 33 by means of a rod 45 pivotally connected thereto.

The pilot valve mechanism 37 is actuated by a pressure-responsive mechanism 48 of well known construction. It comprises a cylinder 49 having disposed therein a piston 50. Arranged in one end of the cylinder is an inlet 51 which may be connected to any source of pressure in accordance with which it is desired to control the flow of the fluid from the steam drum 10. As illustrated, I provide a conduit 52 which connects with the steam drum 10, and the safety valve 12 is therefore operated in response to the pressures prevailing therein. The piston 50 is secured to a rod 53 which may be provided with a weight 54 and a compression spring 55 bearing against a suitable abutment 56, the weight and the spring exerting a counterforce against the force created by the pressure of the fluid acting upon the lower face of the piston 50. The rod 53 is connected, through a floating link 57, to a lever 58 fulcrumed at 59. The lever 58 is in turn connected through a lever 60 and a floating link 61 to a lever 62 which actuates, through a floating link 63, a valve stem 64 secured to the pilot valve 37. The lever 62 is fulcrumed at 65 to the piston rod 45 which is associated with the power cylinder 36. The lever 60 is agitated by a motor 68 which drives a cam 69 through suitable speed reduction gearing 71. A rod 72 connects the cam 69 to the lever 60.

Having thus described one form of my invention the operation thereof is as follows: The pressure of the fluid which is present in the steam drum 10 is conveyed, by means of the conduit 52, to the underside of the piston 50 and exerts an upward force thereon which is counteracted by the combined efforts of the spring 55 and of the weight 54. Upon accumulation of sufficient pressure, however, the resistance offered by the weight 54 and the spring 55 is partly overcome and the piston 50 moves in an upward direction, thereby lowering the pilot valve 37 by means of the numerous levers and links illustrated. Upon the lowering of the pilot valve 37, extraneous fluid under pressure, such as oil, flows through the inlet 38 and communicating means 43 to the lower end of the power cylinder 36, wherein it acts upon the piston 44 to move it upwardly. Coincident with the passage of the motive fluid to the lower end of the power cylinder 36, the fluid which is present in the upper portion of the cylinder is released by the pilot valve 37 and escapes through the communicating passage 42 to the discharge connection 41.

The movement of the piston 44 exerts an upward pull upon the lever 33 and draws that valve stem which is disposed in closer proximity thereto, that is the valve stem 32, upwardly until the stop valve disc 19 reaches its limit of travel or its wide-open position. Upon the valve disc 19 assuming this position, the valve stem 21 is drawn upwardly by the continued movement of the power piston 44, thereby removing the regulating valve disc 18 from its seat 16 and returning the pilot valve 37 to a closed position. While the valve disc 19 is therefore in a wide-open position, the disc 18 is only raised an amount sufficient to permit such a limited flow of fluid from the steam drum 10 as will avoid an excessive drop in pressure. Should the pressure within the steam drum 10 continue to rise with the regulating disc in this position, the increasing pressure causes the pressure responsive mechanism 48 to again move the pilot valve 37 to further raise the piston 44 to permit the escape of an increased amount of fluid. While I have accomplished the primary raising of the stop valve disc 19 and the subsequent raising of the governing valve disc 18 by a proper proportioning of the arms of the lever 33, this result may be accomplished in numerous other ways, such as by a proper proportioning of the weights 25 and 26, or the springs 27 and 28.

Upon escape of sufficient steam to effect the desired reduction of pressure within the steam drum 10, the piston 50 is lowered by the compressive force of the spring 55 and by the weight 54 and the piston 44 within the power cylinder 36 is moved downwardly in the manner heretofore described to close the stop valve disc 19 and subsequently the regulating valve disc 18. These discs are held on their respective seats by the pressure of the oil which is present in the power cylinder 36. The force exerted by this oil pressure may, if desired, be considerably in excess of that which is acting upon the lower faces of the valve discs. In this manner, the discs are held against their seats with a considerable force, which force is unaffected by fluctuation in the pressure of the steam contained in the steam drum. In addition thereto, as the stop valve disc 19 assumes only a wide-open or a closed position, the cutting or erosive action of the steam is confined to the seat 16 associated with the regulating valve disc 18, which, in a relatively short time, permits leakage of fluid into the connecting passage 15. With my improved device, this fluid cannot escape inasmuch as it is prevented by the stop valve disc 19. Because of the very limited volumetric capacity of the connecting passage 15, the amount of leakage between the valve disc 18 and its seat 16 is relatively small. Pressure of the steam which is present in the connecting passage 15 facilitates the operation of my device as this pressure acts upon the underside of the stop valve disc 19, tending to open it, and acts upon the upper side of the regulating valve disc 18, tending to hold it closed, which combined action has a resultant tendency to insure a primary raising of the stop valve disc 19 and a subsequent raising of the regulating valve disc 18. The motor 68 operates continuously and the throw of the eccentric 69 imparts a very limited reciprocatory motion to the fluid relay mechanism, thereby avoiding static friction.
In Fig. 2, I show another embodiment of my device, which embodiment is especially adapted for use wherein an instantaneous or extremely rapid blow down is desired. This may be readily accomplished by altering the arrangement of levers interposed between the pressure-responsive mechanism and the fluid relay mechanism. It entails connecting the rod 53 through the floating link 57 to a lever 58' in the usual manner. The lever 58' is fulcrumed at 59' and is connected at its opposite end through a floating link 75 to a lever 76. The last named lever connects the piston rod 45 of the power cylinder with the stem 64 of the pilot valve, the latter connection being through a floating link 63. The operation of this embodiment is obvious. Upon accumulation of sufficient pressure in the lower portion of a cylinder 49, the piston 50 and the piston rod 53 move upwardly, thereby lowering the floating link 75 and causing the pilot valve 37 to be moved downwardly and admit fluid pressure to the underside of the power piston 44. The upward movement of the power piston 44 further lowers or accelerates the downward movement of the pilot valve 37, thereby causing the upward movement of the piston 44 to be continued until such time as it reaches its upward limit of travel, or until such time as the pressure in the steam drum 10 has been relieved sufficiently to cause the pressure-responsive mechanism 48 to act in the reverse direction. In this manner, an extremely rapid opening and closing of the safety valve may be readily effected.

In Fig. 3, I show an arrangement of levers for connecting the pressure responsive mechanism to the fluid relay mechanism, which arrangement is suitable for installations where no agitating apparatus is desired.

While I have shown my invention in but three forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a device for relieving the excess pressure of a fluid contained in a vessel, the combination of an outlet conduit, valve means for opening and closing the conduit, a second valve means for regulating the flow of the fluid upon an opening of said first-mentioned valve means, said second valve means being interposed between the vessel and the first-mentioned valve means, and means responsive to the pressure of the fluid in the vessel for operating both of said valve means.

2. The combination with a vessel for high-pressure fluid, of outlet conduit means for the vessel, two valves arranged in series in said conduit means, and common operating mechanism for the valves including means for causing the valve more remote from the vessel to open and close before the other valve.

3. The combination with a vessel for high-pressure fluid, of outlet conduit means for the vessel, two valves arranged in series in said conduit means, common operating mechanism for the valves including means for causing the valve more remote from the vessel to open and close before the other valve, and a pressure-responsive device for controlling said common operating mechanism.

4. In a device for relieving the excess pressure of a fluid contained in a vessel, the combination of a conduit for permitting the escape of fluid from the vessel, a valve disposed in the conduit for opening or closing said conduit, a second valve disposed in the conduit for regulating the flow of the fluid upon an opening of the first valve, and fluid-pressure means for actuating said regulating valve and for maintaining the first-mentioned valve in an open or closed position by the exertion of a force which is not affected by changes in pressure occurring within the vessel.

5. In a device for relieving the excess pressure of a fluid contained in a vessel, the combination of a conduit for permitting the escape of fluid from the vessel, a valve for opening and closing the conduit, a second valve interposed between the first valve and the vessel for regulating the flow of the fluid through the conduit, means for biasing both the first and second valves to a closed position, and fluid-pressure means for actuating said first and second valves.

6. In a device for relieving the excess pressure of a fluid contained in a vessel, a conduit for permitting the escape of fluid from the vessel, a valve for opening and closing the conduit, a second valve for regulating the flow of the fluid as permitted by the opening of the first valve, an operating cylinder for actuating the valves, a pilot valve for supplying extraneous fluid under pressure to the operating cylinder, and a pressure-responsive mechanism for actuating the pilot valve.

7. In a device for relieving the excess pressure of a fluid contained in a vessel, a conduit for permitting the escape of fluid from the vessel, a valve for opening and closing the conduit, a second valve for regulating the flow of the fluid as permitted by the opening of the first valve, an operating cylinder for actuating the valves, a pilot valve for supplying extraneous fluid under pressure to the operating cylinder, and means responsive to the pressure prevailing within the vessel for actuating the pilot valve.

8. In a device for relieving the excess pressure of a fluid contained in a vessel, a conduit for permitting the escape of fluid from the vessel, a valve for opening and closing the conduit, a valve for regulating the flow of the fluid through the conduit, and an operating cylinder for maintaining the first-mentioned valve in a fully opened or closed position by the exertion of a constant force and for actuating the regulating valve in response to the pressure prevailing within the vessel.

9. In a device for relieving the excess pressure of a fluid contained in a vessel, a conduit for permitting the escape of fluid from the vessel, a valve disposed in the conduit, a second valve interposed between the first-mentioned valve and the vessel, and fluid-pressure means for opening and closing the first valve and for subsequently opening the second valve, said fluid-pressure means thereafter actuating said second valve in such manner as to regulate the flow of the fluid escaping from the vessel.

10. In a device for relieving the excess pressure of a fluid contained in a vessel, a conduit for permitting the escape of fluid from the vessel, a fluid-tight valve disposed in the conduit, a leaky valve interposed between the fluid-tight valve and the vessel, and fluid-pressure means actuated by pressure-responsive mechanism for opening and closing the fluid-tight valve and for actuating the leaky valve in such manner as to regulate the flow of the fluid escaping from the vessel as permitted by the opening of the fluid-tight valve.

11. In a device of the type described, the combination with a passage for fluid under pressure, of a valve in the passage, means for actuating the valve in response to predetermined changes in pressure, and means for relieving the valve from the erosive action of slight pulsations of pressure.

12. In a device of the type described, the combination with a passage for fluid under pressure, of a valve in the passage, means for actuating the valve in response to predetermined changes in pressure, and means in the passage and on the pressure side of the valve for protecting said valve from the erosive action of slight pulsations of pressure.

13. In a device of the type described, the combination with a passage for fluid under pressure, of means for restricting the flow through the passage, means for opening or closing the passage, and a control means for actuating both the first and the second-mentioned means in response to predetermined variations in pressure.

14. In a device of the type described, the combination with a passage for fluid under pressure, of means for restricting the flow through the passage, means for opening or closing the passage, and a servo-motor for actuating both the first and the second-mentioned means in response to predetermined variations in pressure.

15. In an apparatus of the character described, the combination with a passage for fluid under pressure, of valves arranged in series in the passage for controlling the flow of fluid therethrough, and means responsive to predetermined changes in fluid pressure for actuating the respective valves in progression in the direction of the source of pressure.

In testimony whereof, I have hereunto subscribed my name this twenty-seventh day of October, 1924.

ROBERT C. ALLEN.